Patented July 13, 1937

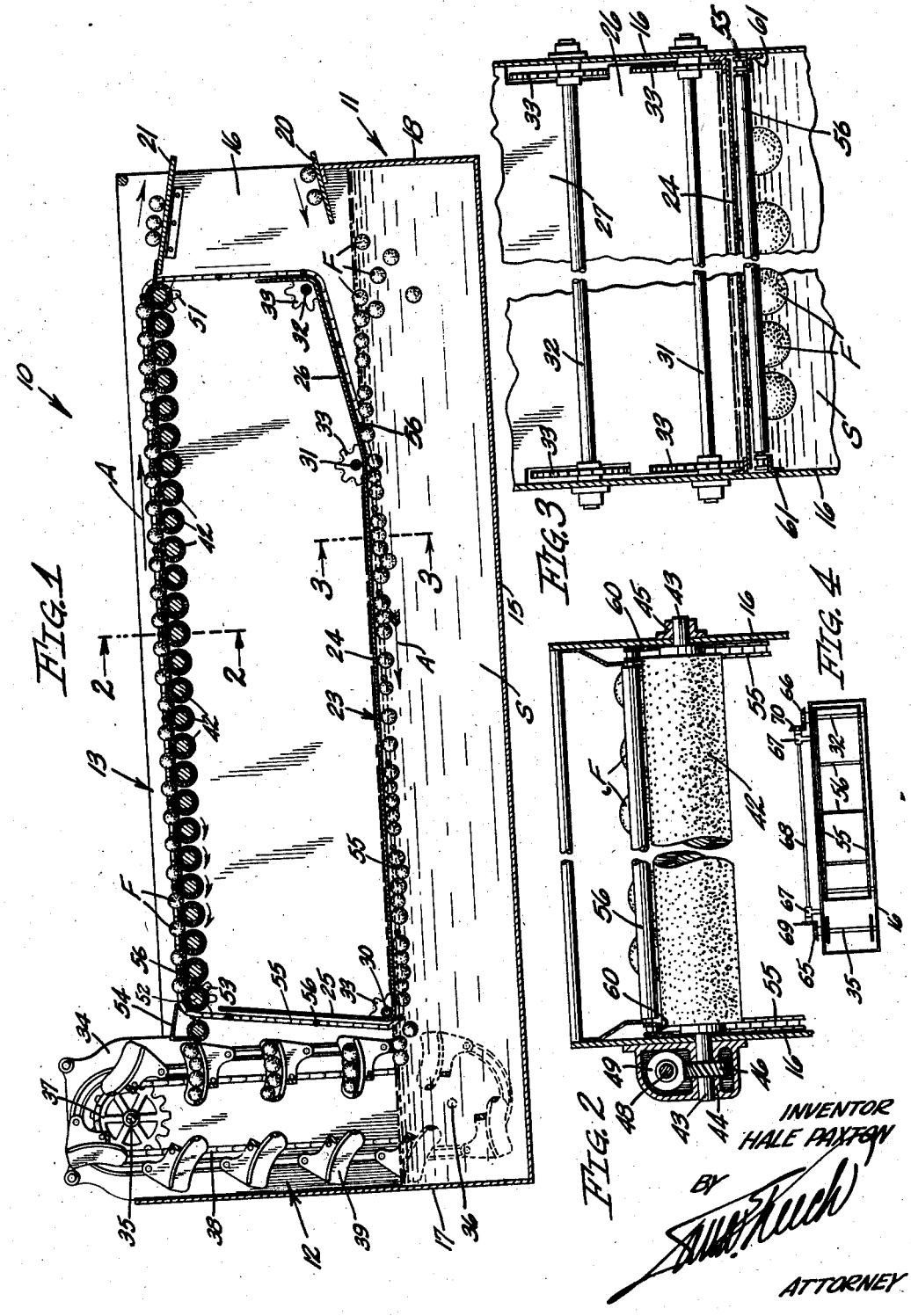

2,086,877

UNITED STATES PATENT OFFICE 2,086,877

COMBINED SOAKING TANK AND WASHER

Hale Paxton, Santa Ana, Calif., assignor, by mesne assignments, to Food Machinery Corporation, a corporation of Delaware Application April 24, 1935, Serial No. 17,966

4 Claims. (Cl. 146—194)

My invention relates to the preparation of agricultural produce for market and more particularly to a machine for washing or otherwise treating fresh fruits such as oranges, lemons, apples, etc.

In the citrus industry the fruit to be packed is first thoroughly washed by immersing the fruit in tanks containing a suitable solution for dissolving and loosening the dirt and scale on the surface thereof. After being soaked, the fruit is delivered to a brushing unit and scrubbed to remove any remaining scale or dirt.

An object of my invention is to provide a fruit washing machine in which the soaking tank and scrubbing unit are combined in a manner to simplify construction and provide a compact efficient washer.

Another object of my invention is to provide a washer in which a single means is provided for submerging and conveying the fruit through the soaking tank and for carrying the fruit through the brushing unit.

A further object of my invention is to provide a fruit washer in which the quantity of fruit carried through the soaking tank is equal to the quantity that can be efficiently handled by the brushing unit.

Other objects and advantages will be made manifest in the following description taken in connection with the accompanying drawing in which:

Fig. 1 is a vertical, longitudinal sectional view of a preferred form of my invention.

Figs. 2 and 3 are fragmentary cross sectional views taken on the lines 2—2 and 3—3 of Fig. 1.

Fig. 4 is a reduced, diagrammatic plan view of the machine shown in Fig. 1.

Referring specifically to the drawing, a fruit washer 10 comprising a preferred embodiment of my invention is shown in Fig. 1, this washer including a soaking tank 11, an elevator 12 and a brushing unit 13.

The tank 11 includes a bottom 15, side walls 16 and ends 17 and 18, the end 18 being relatively low in height to provide space for suitable inclined inlet and outlet boards 20 and 21 respectively. Supported by the side walls 16 of the tank 11 is a plate 23 having a horizontal deck portion 24, a substantially vertical wall 25 at one end thereof and an inclined wall 26 and vertical wall 27 at the opposite end thereof. Journalled in the side walls 16 of the tank 11 adjacent the plate 23 are transverse shafts 30, 31 and 32 upon each of which a pair of sprockets 33 is fixed. Provided in the tank 11 is a fruit soaking solution S, the level of which is maintained slightly above the deck 24 as shown in Fig. 1.

The elevator 12 positioned at one end of the tank 11 includes a frame 34 in which upper and lower shafts 35 and 36 respectively are journalled, each of these shafts having sprockets 37 fixed on opposite ends thereof. Trained about the sprockets 37 at each side of the elevator 12 is a chain 38. Carried by the chains 38 are baskets 39, the latter serving to lift fruit from the solution S and deliver the same to the brushing unit 13. A complete description of the construction and operation of the elevator 12 can be found in the application for U. S. Letters Patent filed March 18, 1935 by Thomas H. Hudspeth, Serial No. 11,577.

The brushing unit 13 includes a plurality of rotary brushes 42 having shafts 43 journalled in bearings 44 and 45 on the side walls 16 of the tank 11 as shown in Fig. 2. Keyed on one end of each of the brush shafts 43 is a spiral gear 46. Each of the brushes 42 is driven in the direction indicated by the arrows of Fig. 1 by a common shaft 48, the latter having gears 49 keyed thereon, these being positioned to mesh with the gears 46 of the shafts 43 as shown in Fig. 2.

Rotatably mounted on each end of the shaft 43 of the end brush 42 adjacent the outlet board 21, is a sprocket 51, similar sprockets 53 being mounted on the shaft of one of the brushes 42 at the opposite end of the brushing unit 13. Journalled at the opposite end of the brushing unit 13 adjacent the elevator 12 is an idle shaft 52 having a sprocket 53 on each end thereof. Mounted above the shaft 52 is an inclined plate 54 for delivering the fruit from the elevator 12 to the brushing unit 13.

Trained about the sprockets 33, 51 and 53, at each side of the machine 10 is an endless chain 55, the latter carrying the opposite ends of a plurality of transverse, equally spaced bars 56. Fixed on the side walls 16 of the tank 11, as shown in Fig. 2, are angle iron bars 60, upon which the upper flights of the chains 55 slide, similar angle bars 61 being provided to carry the lower flights of the chains 55 as shown in Fig. 3. The chains 55 are driven at a relatively slow rate of speed by applying power in any suitable manner to the shaft 30, the direction of travel of the chains 55 being indicated by the arrow A of Fig. 1.

Fixed on one end of the shaft 35 of the elevator 12, as shown in Fig. 4, is a bevel gear 65, a similar gear 66 being fixed on the shaft 32. Journalled in suitable bearings 67 on one side of the washer 10 is a shaft 68, the latter having bevel gears 69 and 70 on its ends, these meshing with the gears 65 and 66 as shown.

Operation

When the elevator 12 is set in motion, power is transmitted from the elevator 12 to the chains 55 by the shaft 68, the elevator 12 and chains 55 being driven at equal speeds, and timed so that one of the bars 56 starts across the brushing unit 13 shortly after each basket of fruit is dumped thereon, it being noted that the spacing of the bars 56 is substantially equal to the spacing of the baskets 39 of the elevator 12. Fruit F is delivered to the board 20, dropped into the solution S, and floats under the inclined wall 26 where it is engaged by the moving bars 56 of the chains 55 and is carried under the deck 24. The fruit is carried along the deck 24 by the bars 56 and discharged into the path of the baskets 39 of the elevator 12. At this point the fruit F is lifted from the solution S by the baskets 39 and dumped onto the receiving end of the brushing unit 13. Here the fruit is thoroughly scrubbed by the rapidly rotating brushes 42 and is urged across the unit 13 by the bars 56 and dropped onto the outlet board 21. It will be noted that the provision of the chains 55 and bars 56 for submerging and delivering fruit to the elevator 12 as well as feeding the fruit across the brushes 42 is a very simple means for providing the proper amount of fruit for the brushing unit 13 at all times. It will also be seen that the provision of means for driving the elevator 12 and the chains 55 at equal speeds causes the bars 56 to urge fruit across the brushing unit 13 at the same rate that the fruit is delivered to the brushing unit by the elevator 12.

Although I have shown and described but one preferred form of my invention, it is to be understood that various modifications and changes might be made therein without departing from the spirit and scope of the appended claims.

I claim as my invention:

1. In a fruit washer, the combination of: a fruit soaking tank; a plurality of power driven, rotary brushes mounted transversely of said tank above the surface of solution therein, the uppermost portions of said brushes forming a continuous fruit brushing surface; an elevator for lifting fruit from said solution and depositing said fruit on said brushing surface; power driven endless chain means extending under said rotary brushes and over said brushing surface; and fruit impelling means carried by said chain means to move under the surface of said solution and feed fruit in said solution to said elevator and to feed said fruit across said brushing surface.

2. In a fruit washer, the combination of: a fruit soaking tank; a series of power driven transverse rotary brushes forming a fruit brushing surface above the level of solution in said tank; an elevator at one end of said tank to lift fruit from said tank and dump said fruit onto one end of said brushing surface; an endless chain at each side of said brushing surface, said chain encircling said brushes; fruit impelling means carried by said chains to urge said fruit across said brushing surface, said elevator and said chains being driven in timed relation to cause said fruit impelling means to urge fruit across said brushing surface at the same rate that said fruit is delivered to said brushing surface by said elevator.

3. In a fruit washer, the combination of: a fruit soaking tank; a series of power driven transverse rotary brushes forming a fruit brushing surface above the level of solution in said tank; an elevator having spaced baskets for elevating fruit from said tank and dumping said fruit onto one end of said brushing surface; an endless chain at each side of said brushing surface; a plurality of transverse bars carried by said chains, said bars being spaced substantially equal to the spacing of said elevator baskets; power means for driving said elevator and said chains so that said baskets and said bars travel at equal speeds, said bars being timed relative to said baskets so that each of said bars starts across said brushing surface immediately following the dumping of fruit on said brushing surface by each of said baskets.

4. In a fruit washing apparatus the combination of a processing tank, a fruit washing apparatus consisting of a series of transverse rotating brushes mounted above said tank, the upper surfaces of the said brushes rotating in the direction of the travel of the fruit moving thereover, elevating means asociated therewith for delivering fruit from said processing tank to the fruit washing means thereabove and endless chain traveling means for moving fruit through the processing tank and delivering it to the elevating means in timed relation thereto, said traveling means having one run extending above said brushes and one run below said brushes; and means carried by said chain means and extending therefrom to propel the fruit across the brushes and engage the fruit in said processing tank to propel the fruit therein to said elevating means.

HALE PAXTON.